United States Patent [19]

Lacour

[11] Patent Number: 5,294,066

[45] Date of Patent: Mar. 15, 1994

[54] POWER CABLE SPOOLING/UNSPOOLING DEVICE

[75] Inventor: Gilles Lacour, Belley, France

[73] Assignee: Delachaux S.A., France

[21] Appl. No.: 8,176

[22] Filed: Jan. 25, 1993

[30] Foreign Application Priority Data

Jan. 27, 1992 [FR] France .................. 92 00838

[51] Int. Cl.$^5$ ............................................. B65H 75/34
[52] U.S. Cl. .................... 242/54 R; 242/86.51
[58] Field of Search ............. 242/54 R, 86.5 R, 86.51; 254/273, 272, 362

[56] References Cited

U.S. PATENT DOCUMENTS

| 4,511,100 | 4/1985 | Oetringhaus | 242/86.51 |
| 4,537,364 | 8/1985 | Pollman et al. | 242/86.51 |
| 4,565,334 | 1/1986 | Ruhl | 242/54 R |

FOREIGN PATENT DOCUMENTS

| 2041820 | 4/1972 | Fed. Rep. of Germany . |
| 3310311 | 9/1984 | Fed. Rep. of Germany . |
| 3921679 | 1/1991 | Fed. Rep. of Germany . |
| 2175088 | 10/1973 | France . |
| 2391393 | 12/1978 | France . |

*Primary Examiner*—John M. Jillions
*Attorney, Agent, or Firm*—Blakely, Sokoloff, Taylor & Zafman

[57] ABSTRACT

In a device for spooling and unspooling a power cable or the like on relative displacement of two areas connected to each other by the cable or the like, spooling and unspooling of the cable are powered by an asynchronous motor whose output shaft is permanently engaged without slip with the cable spooling and unspooling drum. The speed and rotation direction of the motor output shaft are controlled in relation to the measured tension in the cable by variable frequency control of the supply of power to the motor to maintain the tension at an approximately constant value. Provision is made for applying calibrated unidirectional braking to the output shaft of the motor in the direction corresponding to the cable unspooling direction. This maintains motor control during unspooling of the cable.

13 Claims, 6 Drawing Sheets

POWER CABLE SPOOLING/UNSPOOLING DEVICE

BACKGROUND OF THE INVENTION

1. Field of the Invention

The present invention concerns a device for spooling and unspooling a power cable or the like upon relative displacement of two areas connected to each other by the cable or the like, said device comprising:

a support disposed in one of said areas, a drum mounted to rotate about a first axis relative to the support and adapted to receive the cable or the like, drive means for rotating the drum about the first axis in a direction to spool the cable or the like and in a direction to unspool the cable or the like by applying traction to the cable between said areas, said drive means comprising an electric drive motor carried by the support and having a rotary output shaft and a kinematic linkage between the drive motor output shaft and the drum so as to associate with the spooling and unspooling directions respective directions of rotation of the drive motor output shaft, and control means for said drive means comprising means for supplying electrical power to the drive motor.

2. Description of the Prior Art

Devices of this kind are often used, for example, to supply electrical power from a socket outlet with is fixed relative to the ground to a machine travelling over the ground such as a crane or a locomotive with a small operating radius or moving upwards and downwards relative to the ground such as a lift platform, this machine constituting said area carrying the support while the ground, or more precisely the socket outlet fixed relative to the ground, constitutes the other of said areas. Such devices are also used to supply electrical power from a lifting machine such as a crane constituting said area carrying the support to a handling device such as an electromagnet or an electrohydraulic scoop constituting said other area and carried by this machine at a variable relative height by means of a cable or other suspension means. Such devices may also be used to spool or unspool under similar conditions a flexible bundle of optical fibers or a flexible hose conveying pressurized fluid, although these examples are by no means limiting on the invention. Depending on individual circumstances, the cable is spooled on the drum in a spiral or in a helix or in a combination of these two spooling modes.

These devices must adapt, to suit the speed of relative displacement of the two areas, the speed at which the cable or the like is spooled or unspooled onto or from the drum expressed as a linear speed tangential to the drum at a distance from the axis of the latter or first axis which varies continuously during spiral spooling in order to avoid slack or excessive tension in the cable or the like.

To this end a synchronous motor is usually employed and this is coupled to the drum by a kinematic linkage comprising a coupling which allows slip. The motor is energized so that its output shaft rotates only in the direction corresponding to spooling onto the drum, at an angular speed which is always greater than the required angular speed of the drum which is essentially variable and allowing for the transmission ratio of the kinematic linkage; the coupling is calibrated so that whatever resisting torque the cable opposes to being spooled onto the drum, allowing for the permissible tension in the cable and the variable distance from the drum axis or first axis at which this tension is applied to the drum, the latter actually turns in the spooling direction and the cable is actually spooled onto it as the two areas that it connects to each other move closer together; the torque and speed of the motor output shaft and those of the drum are matched by slip occurring in the coupling, which absorbs energy that is usually converted to heat. During unspooling, the cable or the like is unspooled, entraining the drum in the corresponding direction, only because of the traction applied to it as the two areas that it connects to each other move further apart, and the combination of the coupling which allows slip and the motor opposes a resisting torque and absorbs energy which is also usually dissipated as heat.

In this known form devices for spooling and unspooling a power cable or the like are entirely satisfactory provided that the cable length is moderate, that is to say that the variation of the spooling radius on the drum remains limited, and provided that in cases where the cable is at a variable height and hangs freely from the drum (for example, if a spooling and unspooling device is used to supply power to a lift platform or to a load suspended from a lifting machine as mentioned above) the variation in this height is restricted to a limited range.

If the cable to be spooled or unspooled is long, however, and if a significantly varying free length of cable or the like is suspended directly from the drum the known devices are not satisfactory, in particular because it becomes difficult to calibrate the coupling which allows slip so that the tension in the cable or the like remains at all times below a safe threshold, so avoiding all risk of damage, and so that the device is capable of spooling the cable or the like over a large radius of the drum and/or is capable of spooling significantly varying free lengths of the cable or the like hanging directly from the drum.

In this known form the devices for spooling and unspooling a power cable or the like have the drawback that, because of inertia, the high accelerations on relative movement of the two areas that the cable or the like connects to each other and the high speeds of such displacement cause large variations in the tension in the cable or the like, including values that are not permissible.

An object of the invention is to remedy these drawbacks.

SUMMARY OF THE INVENTION

The present invention consists in a device for spooling and unspooling a power cable or the like upon relative displacement of two areas connected to each other by the cable or the like, said device comprising:

a support disposed in one of said areas, a drum mounted to rotate about a first axis relative to the support and adapted to receive the cable or the like, drive means for rotating the drum about the first axis in a direction to spool the cable or the like and in a direction to unspool the cable or the like by applying traction to the cable between said areas, said drive means comprising an electric drive motor carried by the support and having a rotary output shaft and a kinematic linkage between the drive motor output shaft and the drum so as to associate with the spooling and unspooling directions respective directions of rotation of the drive motor output shaft, and control means for said drive means comprising means for suppling electrical power to the drive motor, wherein:

the drive motor is of the asynchronous type, its electrical power supply means being alternating current supply means and its output shaft is in permanent slip-free engagement with the drum through the intermediary of the kinematic linkage, the control means are adapted to cause the drive motor to be supplied with power by the means for supplying it with electrical power so as to rotate its output shaft either in the direction corresponding to the spooling direction or in a direction corresponding to the unspooling direction or to interrupt the supply of power to the drive motor and comprise variable frequency control means responsive to said tension to control the supply of power to the drive motor to maintain said tension at an approximately constant value on spooling and on unspooling the cable or the like, and means are provided to exert calibrated unidirectional braking on the output shaft of the drive motor in the direction corresponding to the unspooling direction.

Thus the present invention proposes to rotate the drum by means of a drive motor not only in the spooling direction but also in the unspooling direction, providing a kinematic coupling which does not allow slip between the drum and the motor output shaft and using a motor which is of a type in which not only is the output shaft able to rotate in both directions but which also allows continuous fine adjustment of the rotation speed of the output shaft according to the required linear speed of spooling or unspooling of the cable or the like in the area of the drum; these requirements are expressed in terms of the tension applied to the cable or the like which must be sufficiently high to avoid any slack in the cable or the like but which must remain below a threshold chosen to avoid any risk of damage to the cable or the like by excessive tension.

In this regard controlling the motor on the basis of information produced by said means responsive to the tension in the cable or the like provides protection against excessive tension, especially in the case of high acceleration and high speed of relative displacement between the two areas that the cable or the like connects to each other.

The provision of unidirectional brake means for the motor output shaft (which can naturally act indirectly on the output shaft, in particular through the intermediary of the kinematic linkage which does not allow slip) enables the supply of motive power to the motor not only during spooling, when this motive power is used to entrain the cable through the intermediary of the drum without impediment by the unidirectional brake means, but also during unspooling, when this motive power is supplied to the unidirectional brake means; this provides the possibility not only during spooling but also during unspooling of regulating the rotation speed of the motor output shaft, given the type of motor employed.

Note that the brake means are not of a kind introducing any slip between the motor output shaft and the drum, so that it is possible to eliminate the aforementioned drawbacks arising from any such possibility of slip if the length of the cable or the like to be spooled and unspooled is great and/or the cable or the like hangs from the drum at a widely varying height. What is more, variations in the rotation speed of the drive motor output shaft controlled according to information provided by the means responsive to the tension in the cable or the like are transmitted immediately and reliably to the drum whose rotation speed is therefore adapted virtually immediately, without inertia effects, to the value required to maintain the tension in the cable or the like at an approximately constant value, even if, for example, there is sudden acceleration or a high speed of relative displacement of the two areas connected to each other by the cable or the like. Variable frequency control of the asynchronous motor provides at all times fine adjustment of the drum rotation speed to requirements dictated by the relative displacement of the two areas connected to each other by the cable or the like, the tension in the cable or the like being held approximately constant.

Apart from the fact that their presence enables variable frequency control of the asynchronous motor in both rotation directions of its output shaft, the unidirectional brake means for this output shaft advantageously constitute a safety feature in the event of accidental interruption of the electrical power supply to the motor driving the drum and to the motors, usually also electric motors, causing the relative displacement of the two areas connected to each other by the cable or the like. If the power supply is interrupted while the two areas are moving closer together, that is when spooling the cable or the like, the unidirectional brake means do not prevent the drum continuing to rotate by inertia in the spooling direction as the two areas continue, again by virtue of inertia, to move closer together, so that slack in the cable is avoided as much as possible; if the supply of electrical power is interrupted while the aforementioned two areas are moving apart, that is during unspooling of the cable, the unidirectional brake means brake the drum to prevent continued rotation of the drum by virtue of inertia in the unspooling direction to compensate further movement apart of the two areas due to inertia, but this braking action is calibrated and can be adjusted so that in such circumstances it does not lock up the drum and the tension applied to the cable remains below a threshold at which there is a risk of damaging it, so preventing any such damage.

Nevertheless a device in accordance with the invention can be implemented in a particularly simple and therefore economical and reliable manner, in particular through the means for applying calibrated unidirectional braking to the output shaft of the drum drive motor.

Thus in one particularly simple embodiment, said means may comprise:

a brake shaft mounted to rotate about a second axis relative to the support, permanent slip-free kinematic linkage means between the brake shaft and the output shaft of the drive motor so as to associate respective directions of rotation of the brake shaft with the spooling and unspooling directions, a coupling of the type comprising two parts rotatable relative to each other about an axis against a defined resisting torque, a first of said parts being coaxial with and fastened to the brake shaft, and a freewheel mechanism connecting the second of said parts to the support being unlocked in the rotation direction of the brake shaft corresponding the spooling direction and locked in the rotation direction of the braking shaft corresponding to the unspooling direction.

In this case the unidirectional brake means naturally absorb energy from the motor and must dissipate this energy, in the form of heat, for example, throughout the cable unspooling phases.

To reduce this absorption and then dissipation of energy by the unidirectional brake means, in an alternative embodiment, the latter may comprise:

a brake shaft mounted to rotate about a second axis relative to the support, permanent slip-free kinematic linkage means between the brake shaft and the output shaft of the drive motor so as to associate respective rotation directions of the brake shaft with the spooling and unspooling directions, a coupling of the type comprising two parts rotatable relative to each other about an axis against a defined resisting torque, a first of said parts being coaxial with and fastened to the brake shaft, an auxiliary electric motor having a rotary output shaft coaxial with the brake shaft and carrying coaxially with and fastened to it the second of said parts, means for supplying electrical power to the auxiliary motor controlled by the control means to supply electrical power to the auxiliary motor in such a way as to rotate the output shaft of the latter in a direction corresponding to the spooling direction at least during the supply of power to the drive motor by the means for suppling electric power to the latter to rotate the output shaft of the drive motor in a direction corresponding to the spooling direction or to interrupt the supply of electrical power to the auxiliary motor, a freewheel mechanism connecting the output shaft of the auxiliary motor to the support being unlocked in the rotation direction of the output shaft of the auxiliary motor corresponding to the spooling direction and locked in the rotation direction of the output shaft of the auxiliary motor corresponding to the unspooling direction.

The drive motor and the auxiliary motor therefore cooperate through the intermediary of the coupling to drive the drum in the spooling direction and so a less powerful drive motor may be used; it follows that the braking power to oppose rotation of the drive motor output shaft when the drum is to be driven in the unspooling direction is also lower, especially if (as is preferred) the control means are adapted to interrupt the supply of electrical power to the auxiliary motor by the means for supplying electrical power to it during interruption of supply of electrical power to the drive motor by the means for supplying the latter with electrical power and during the supply of power to the drive motor by the means for supplying the latter with electrical power so that the drive motor output shaft is rotated in an unspooling direction; compared with a solution in which the auxiliary motor would continue to be supplied with electrical power so that its output shaft would turn in the spooling direction, this makes it possible to reduce significantly the slip in the coupling during the unspooling phase, that is to say to reduce also the quantity of energy to be dissipated by means of the latter, usually as heat.

Various types of coupling may be used, but a hysteresis type magnetic coupling is preferred, the simplicity, low cost and reliability thereof being familiar to the man skilled in the art.

The means responsive to the tension in the cable or the like may also be implemented in a particularly simple, economical and reliable manner.

Thus in one embodiment they may comprise means for sensing this tension mechanically in series with the cable or the like between the areas which the latter connects to each other. This may be the case, for example, if the cable or the like is to supply power to a load, constituting one of said areas, from a lifting machine constituting the other of said areas, and is disposed in parallel with a flexible link whereby the load is suspended from the lifting machine; the sensor means may then provide both a mechanical connection between the cable or the like and the load, whereby said tension may be measured, and a connection conveying power between the cable or the like and the load, or it may provide only the mechanical connection between the cable or the like and the load; to this end the sensor means may mechanically connect to the load an area of the cable or the like near its connection to the load, the cable or the like being looped between this area and its power supply connection to the load.

The means responsive to said tension may instead comprise means for deviating said cable or the like between said areas, carried by the support and adapted to be retracted reversibly due to the effect of said tension, and means for sensing the position of said deviator means.

Note that deviator means for the cable or the like may be provided in any application of the spooling and unspooling device in accordance with the invention and are in any event provided in many applications such as supply of electrical power from a fixed point to a machine travelling over the ground.

The means for sensing the tension in the cable may be implemented in numerous ways which will be obvious to the man skilled in the art to enable regulation of the power supply to the drive motor either to compensate immediately the least variation in the value of the tension in the cable and to maintain this value as strictly constant as possible or (much more simply but nevertheless acceptably) to maintain the value of the tension in the cable between set point values chosen to avoid both excessive tension and slack in the cable or the like.

Thus, in a preferred embodiment, the means responsive to said tension comprise means for producing a signal whose value is representative of the value of said tension, means for setting set point values of said signal corresponding respectively to maximal and minimal permissible values of said tension, means for comparing the value of the signal to the set point values and producing a signal representative of the result of said comparison, and means for controlling according to this signal the supply of power to the drive motor by the means for supplying electrical power to the latter to maintain the actual value of the tension between the set point values.

According to another preferred aspect of the present invention control means slaved to the rotation direction and the rotation speed of the asynchronous motor are provided, operate exclusively on information as to the actual tension in the cable or the like and are adapted to provide such control in a particularly efficient manner that is particularly well suited to the spooling/unspooling device in accordance with the invention.

Other features and advantages of a device in accordance with the invention will emerge from the following description relating to a few non-limiting embodiments described by way of example and with reference to the appended drawings which form an integral part of this description.

DETAILED DESCRIPTION OF THE INVENTION

Figure 1:
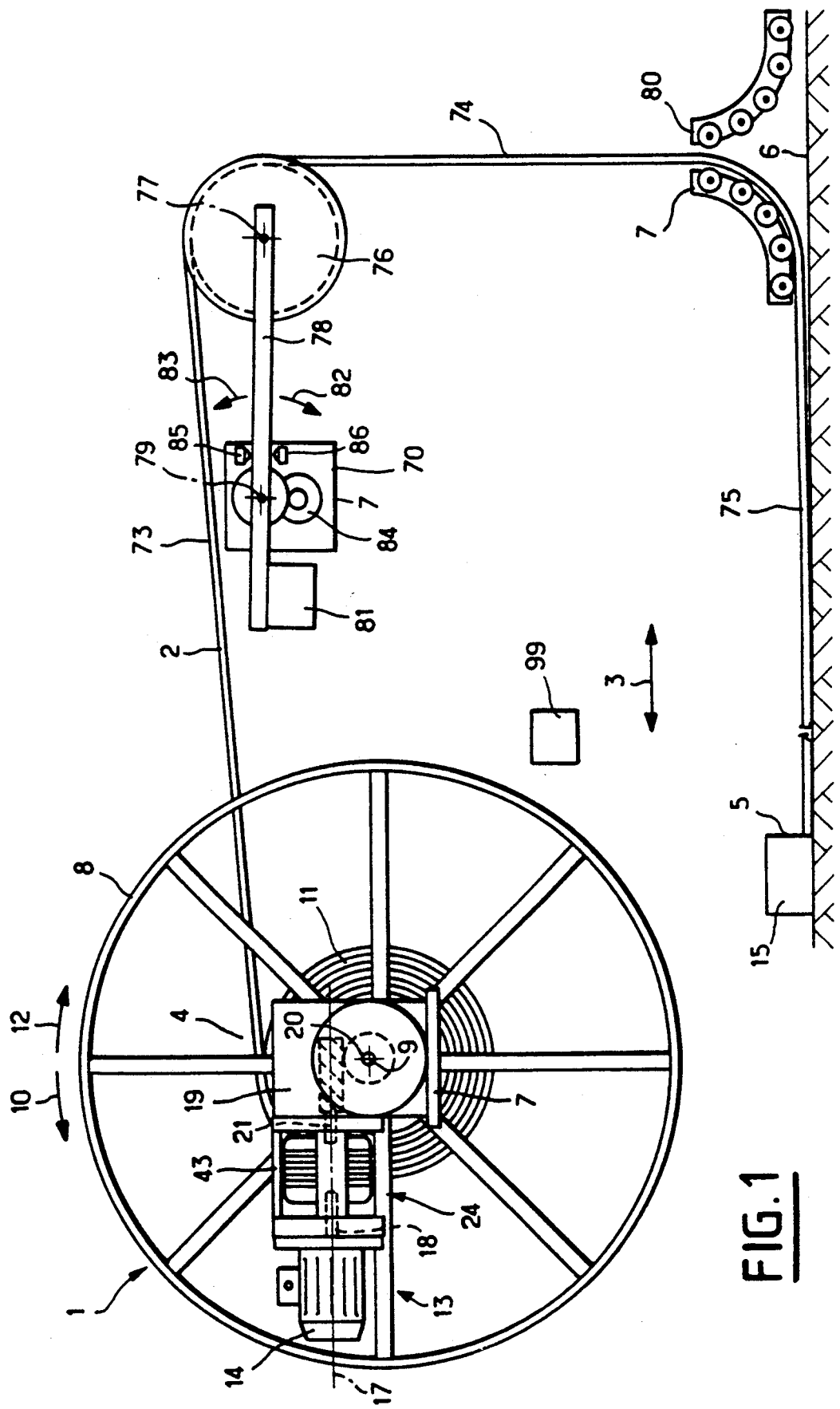
FIGS. 1 through 3 show three applications of a spooling and unspooling device in accordance with the invention in diagrammatic lateral elevation.
Figure 2:
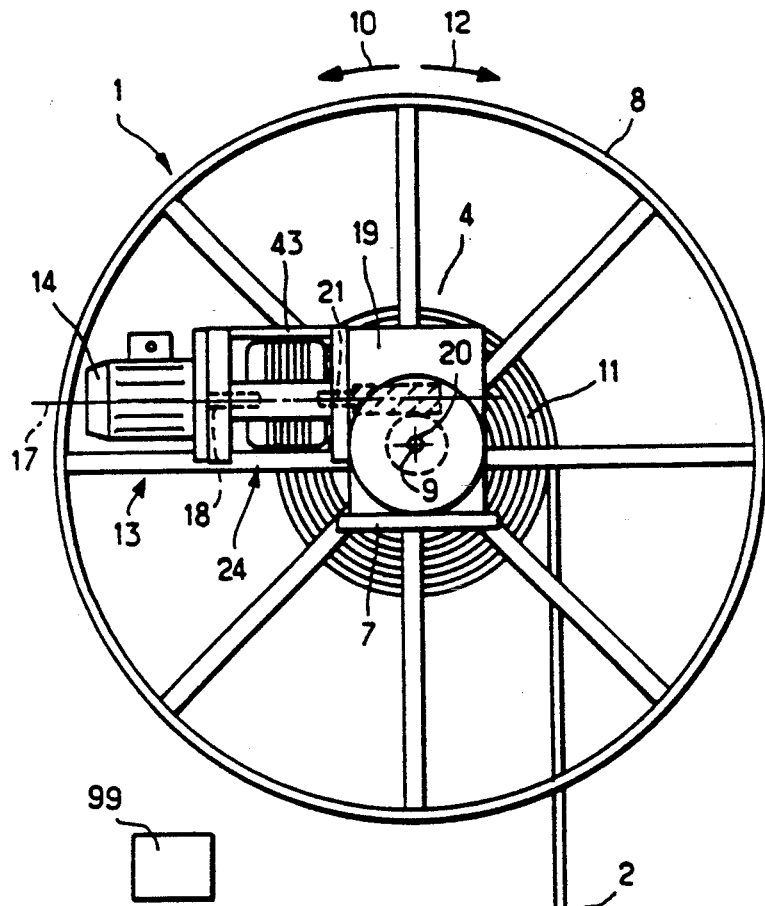
Figure 2:
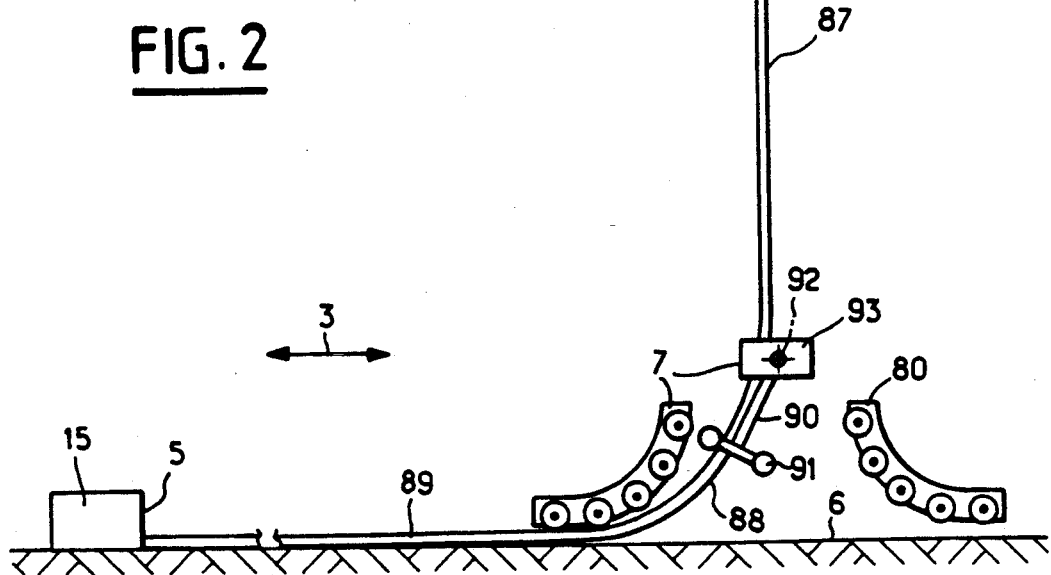
Figure 3:
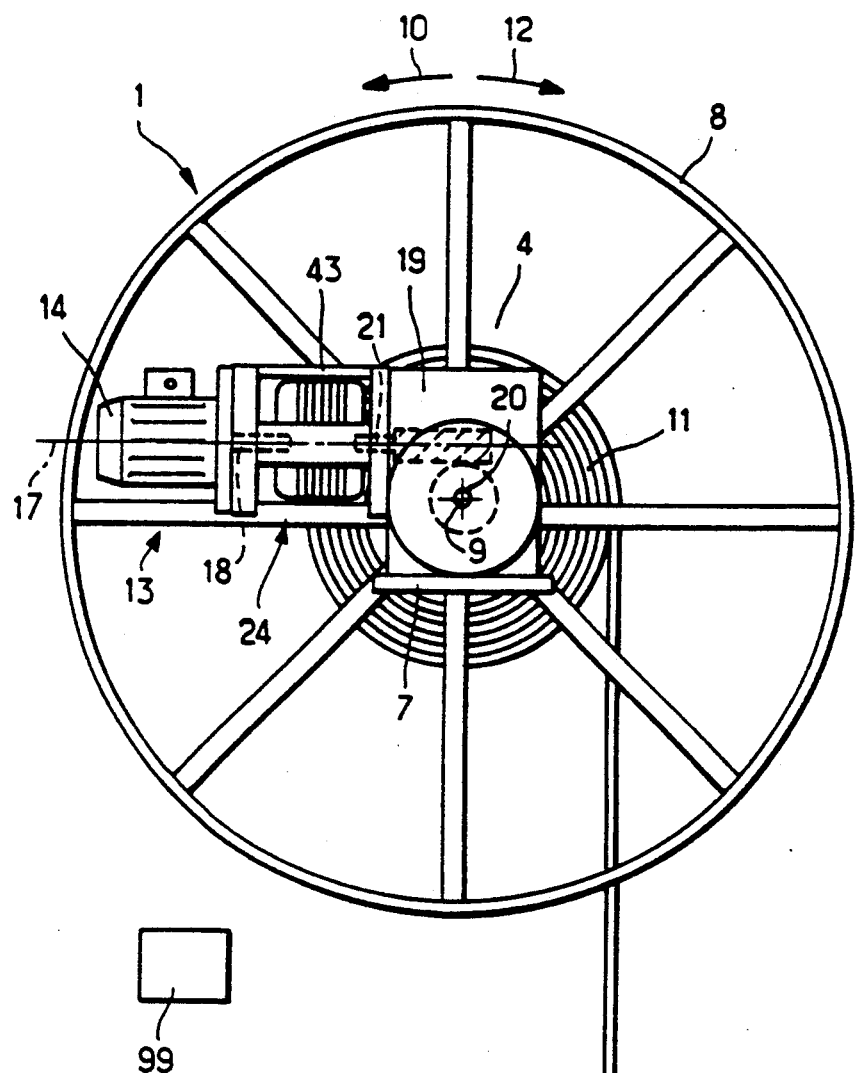

Referring first to FIGS. 1 through 3, a device 1 in accordance with the invention is used to spool or unspool an electric cable 2 on relative displacement 3 (which is horizontal in FIGS. 1 and 2, for example, and vertical in FIG. 3) of two areas 4, 5 the first of which comprises an electrically powered machine travelling on ground 6 that is horizontal, for example, and the second of which comprises a module 15 fixed relative to the ground 6 for supplying electrical power to the machine through the cable 2, in the applications shown in FIGS. 1 and 2; in the application shown in FIG. 3 the first area is a lifting machine (not shown) and the second is a load 16 suspended from this lifting machine by means (also not shown) such as a suspension cable or the like and connected to the machine independently of this suspension by the cable 2 which supplies power from the machine to the load 16 such as a lifting electromagnet or an electro-hydraulic scoop; in the application of FIGS. 1 and 2 the device 1 in accordance with the invention is adapted to spool or unspool the cable 2 according to variations in the length of the path that the latter follows between the areas 4 and 5 as the machine moves over the ground; in the case of FIG. 3 the device 1 in accordance with the invention spools or unspools the cable 2 as the load 5 is raised or lowered.

The electric cable 2 is naturally merely one non-limiting example of a power cable or the like that a device 1 in accordance with the invention is adapted to spool or unspool.

In the three applications shown the device 1 in accordance with the invention is carried, in a manner that is generally known in itself, by a support 7 disposed in the area 4, that is to say fixed with respect to the machine (not shown).

Also in a manner known in itself, the device 1 comprises a drum 8 mounted to rotate relative to the support 7 about a specific, usually horizontal axis 9 so that it can rotate relative to the support 7 about the axis 9 either in a direction 10 to spool the cable 2, for example in a spiral 11 on the drum 8, if the path of the cable 2 between the areas 4 and 5 is shortened or in a direction 12 to unspool the cable 2 if this path is lengthened.

According to the present invention the drum 8 is rotated about the axis 9 relative to the support 7 not only in the spooling direction 10 but also in the unspooling direction 12 by drive means 13 of the drum 8 carried by and attached to the support 7.

The drive means 13 comprise an electric motor 14 which in accordance with the present invention is an asynchronous motor supplied with alternating current by appropriate means advantageously consisting in the electrical power supply module 15 disposed on the ground 6, through the cable 2 and a commutator (not shown) disposed around the axis 9 in the applications shown in FIGS. 1 and 2 and by generally similar means (not shown) in the FIG. 3 application.

The motor 14 has an output shaft 18 along an axis 17 fixed relative to the support and, for example, horizontal and in a plane (not shown) perpendicular to the axis 9. Energization of the motor 14 under the control of control means 99 usually coupled to the means (not shown) controlling the displacement of the machine in the case of the application shown in FIGS. 1 and 2 or to means (also not shown) for controlling raising and lowering of the load in the case of the application shown in FIG. 3 and with the tension exerted on the cable 2 between the areas 4 and 5 controlled to maintain it at an approximately constant value, in a manner that is characteristic of the present invention, rotates the output shaft 18 either in a direction corresponding to rotation of the drum 8 in the spooling direction 10 or in the opposite direction corresponding to rotation of the drum 8 in the unspooling direction 12 at a variable speed modulated to maintain an approximately constant tension in the cable 2 upon relative displacement of the areas 4 and 5 and stops the output shaft 18 when such relative displacement ceases.

To this end the output shaft 18 of the motor 14 is coupled at all times to the drum 8 to rotate it in both directions through a kinematic linkage which does not allow any slip and which comprises, for example, a gearbox 19 having an output shaft 20 on the axis 9 mounted to rotate about the latter axis within the support 7 and fastened to the drum 8, in particular to rotate with it in the two directions 10 and 12, and an input shaft 21 which (see FIG. 4) is coaxially aligned with the output shaft 18 of the motor 14 and mounted to rotate about the axis 17 relative to the support 7 through the intermediary of means that are not shown and is connected to the output shaft 18 of the motor 14 by a coupling 22 which constrains them to rotate together in either direction about the axis 17, for example a claw type coupling employing interpenetrating teeth parallel to the axis 17 and circumferentially engaged, in relation to said axis 17, through the intermediary of radial excrescences of an elastically compressible material ring 23, in a manner that will be familiar to the man skilled in the art.

The shaft 21 is not only the input shaft of the gearbox 19 but also constitutes means of applying calibrated unidirectional braking to the output shaft 18 of the motor 14 in the direction of rotation of the output shaft 18 corresponding to the rotation direction 12 of the drum, that is in the unspooling direction, whereas this braking is removed when the output shaft 18 rotates in the opposite direction corresponding to the direction 10 of the drum 8, that is the spooling direction.

To this end means 24 are disposed around the shaft 21 between the motor 14 and gearbox 19 in the embodiment of the invention shown in FIGS. 1 and 3 and in FIG. 4, although they can be disposed differently as will be described by way of non-limiting example with reference to FIG. 5.

Figure 4:
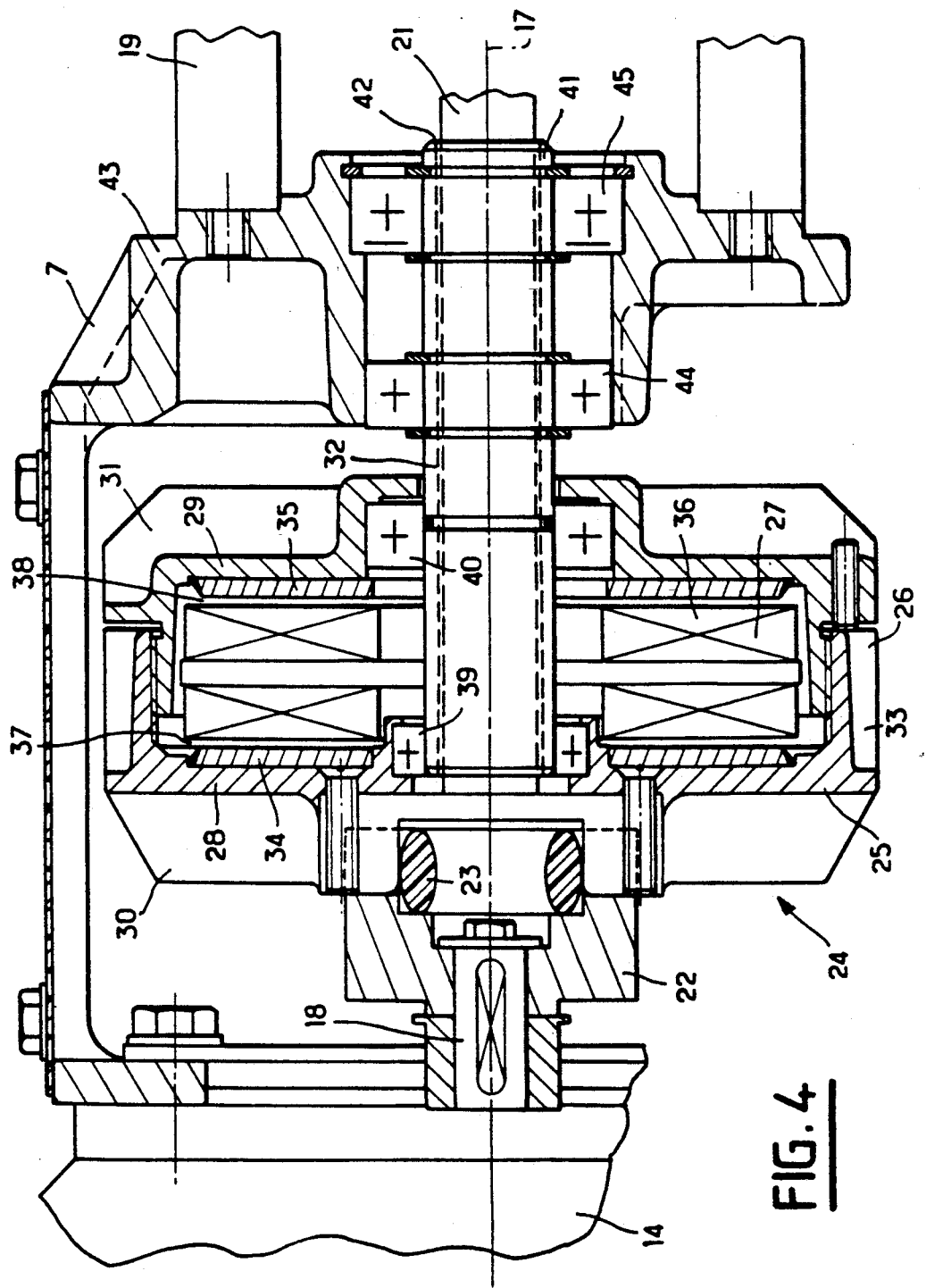
FIG. 4 shows in axial cross-section the calibrated unidirectional brake means fitted to the device in accordance with the invention in these various applications.

Referring firstly to FIG. 4, in the immediate proximity of the coupling 22 the shaft 21 has fastened coaxially around it a part 25 of a coupling 26 of a type having another part 27 disposed coaxially to the part 25, the two parts 25 and 27 being able to rotate relative to each other about their common axis, i.e. the axis 17, against a defined resisting torque.

The coupling 26 shown in FIG. 4 is a hysteresis type magnetic coupling whose parts 25 and 27 respectively comprise an armature coil and a field coil, but other types of coupling can be used without departing from the scope of the invention if they enable slip between their two parts 25, 27 on relative rotation about their common axis 17 against a defined resisting torque.

The part 25 fastened to the shaft 21 comprises an assembly of two flanges 28, 29 fastened together each of which is in the shape of an annular body of revolution about the axis 17 and each of which has cooling fins 30, 31, given that in the example shown the part 25 is an armature whose temperature rises significantly when the two parts 25 and 27 rotate relative to each other. The flange 28 is fastened by any appropriate means, for example by means of screw fasteners, to the shaft 21 in the immediate vicinity of the coupling 22 and its fins 30 face towards the motor 14. The flange 29 is disposed around the shaft 21 with a continuous annular clearance 32 about the axis 17 between the flange 28 and the gearbox 19 towards which its fins 31 project; the flange 29 is supported by the shaft 21 only through the intermediary of the flange 28, the two flanges 28 and 29 being fastened together although their relative position is adjustable parallel to the axis 17 in an exterior peripheral area 33 of the part 25 by means known to the man skilled in the art.

Between this exterior peripheral area 33 and the shaft 21 the flanges 28, 29 have towards each other respective permanent magnets 34, 35 attached to them and disposed in a manner known to the man skilled in the art.

Between the permanent magnets 34, 35 is the part 27 to which are fastened field permanent magnets 36 disposed in a manner known to the man skilled in the art with respective airgaps 37, 38 between them and the permanent magnets 34 and 35 of the flanges 28 and 29. These airgaps are adjustable by adjusting the relative position of the flanges 28 and 29 parallel to the axis 17 as is also known to the man skilled in the art.

The field part 27 is then disposed coaxially around the shaft 21 relative to which it must be able to rotate about the axis 17 in order to be able to rotate relative to the part 25, however.

To this end and through the intermediary of respective bearings 39, 40 disposed between the permanent magnets 34, 35 and the shaft 21, the flanges 28 and 29 support a hollow shaft 41 which is rotatable about the shaft 21 with a continuous annular clearance 42 enabling them to rotate freely relative to each other and which has the part 27 fastened to it between the two bearings 39 and 40. The shafts 21 and 41 are immobilized by any appropriate means against relative movement in axial translation to secure a defined relative position of the parts 25 and 27 of the coupling 26.

The hollow shaft 41 extends parallel to the axis 17 towards the coupling 22, into the immediate proximity thereof, although it does not come into contact with it. In the direction away from the coupling 22 it passes through the flange 29 by means of the annular clearance 32, which prevents any mutual contact, as far as the proximity of the gearbox 19, although it does not come into contact with the latter.

Between the flange 29 and the gearbox 19 the hollow shaft 41 is guided as it rotates about the axis 17 relative to the support 7, to be more precise relative to a bell member 43 which fastens the motor 14 to the gearbox 19 around the hollow shaft 41 between the flange 29 and the gearbox 19 by means of two bearings 44, 45 disposed between the hollow shaft 41 and the bell member 43 and one of which, namely the bearing 45 constitutes a freewheel device which is unlocked in the conjoint rotation direction of the shaft 21 and the output shaft 18 of the motor 14 corresponding to the spooling direction 10 of the drum 8 in order to enable unimpeded conjoint rotation of the two parts 25 and 27 of the coupling 26 with the shaft 21 and the output shaft 18 in this direction. The freewheel device is locked in the conjoint rotation direction of the shaft 21 and the output shaft 18 of the motor 14 corresponding to the unspooling direction 12 to prevent, on rotation of the shaft 21 and of the output shaft 18 in this direction, the part 27 freely accompanying the rotation of the part 25 and so cause the aforementioned defined resisting torque to appear between the two parts 27 and 25, respectively immobilized relative to the support 7 and rotated about the axis 17 relative to the latter, conjointly with the shaft 21 and with the output shaft 18.

The presence of the coupling 26 thus retains a resisting torque which tends to oppose the conjoint rotation of the shafts 21 and 18 both when unspooling the cable and consequently supplying the motor 14 with electrical power and when spooling the cable 2, and so enables variable frequency motor control to adjust the rotation speed of its output shaft 18 about the axis 17 so that the drum 8 produces an approximately constant tension in the cable 2, not only when spooling the cable but also when unspooling it, by means to be described later.

Figure 5:
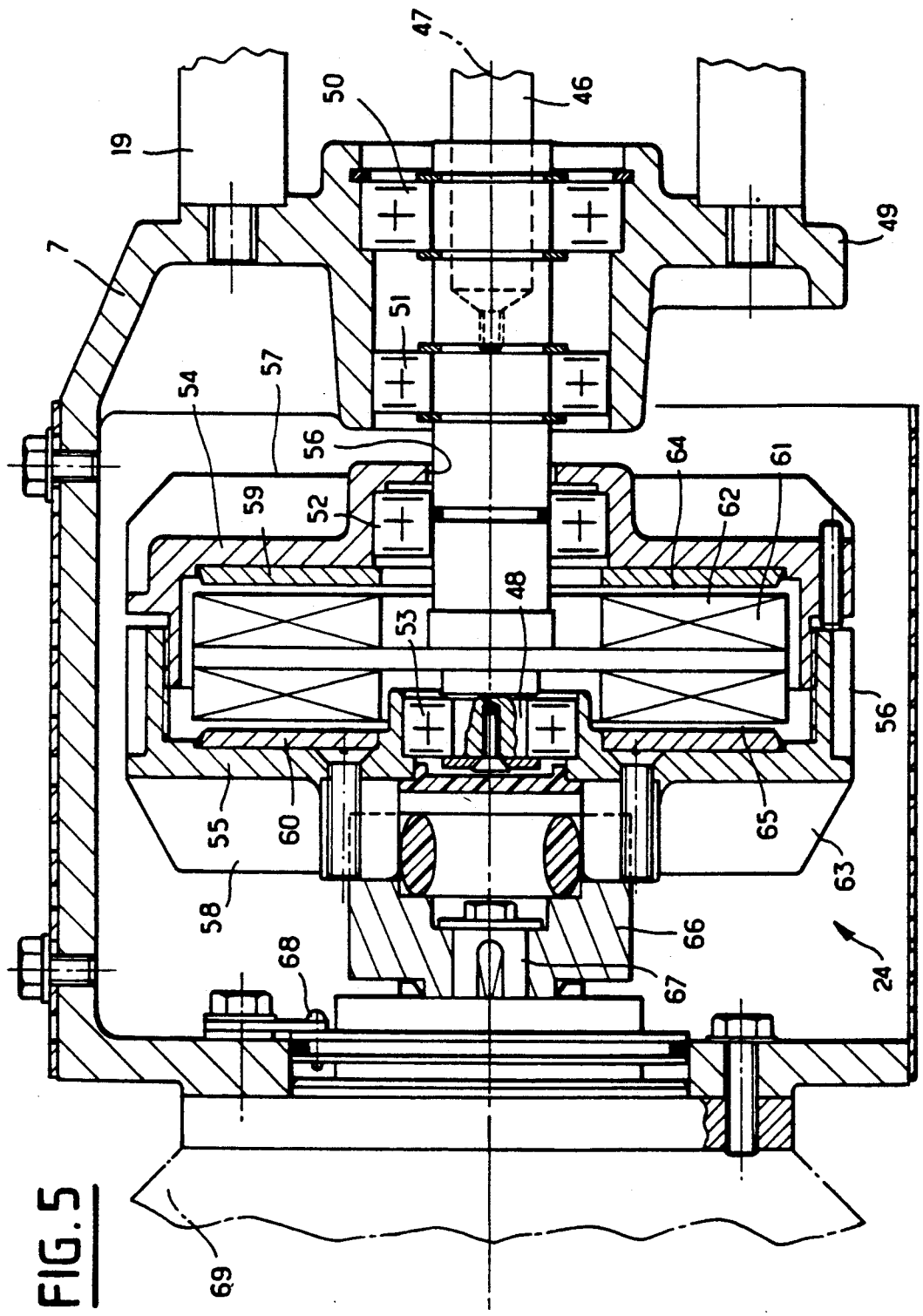
FIG. 5 is a view analogous to that of FIG. 4 showing an alternative embodiment of the calibrated unidirectional brake means.

Although disposing the unidirectional brake means 24 between the motor 14 and the gearbox 19 is generally advantageous in terms of overall size, it is naturally possible to consider other positions of the unidirectional brake means 24 and FIG. 5 to which reference should now be made specifically shows one such other position.

In this case the motor 14 may be directly juxtaposed to the gearbox 19 by shortening the input shaft 21 of the latter and the unidirectional brake means 24 may be designed and disposed to act on any shaft 46 mounted to rotate relative to the support 7 about an axis 47 and kinematically coupled, directly or indirectly but without any slip, to the output shaft 18 of the motor 14 so as to rotate in one or other of two defined directions depending on whether the output shaft 18 of the motor 14 rotates in the direction corresponding to the spooling direction 10 of the drum 8 or to the unspooling direction 12 thereof.

The shaft 46 may therefore be one and the same as the shaft 20 of the drum 8 or, and preferably, constitute an extension of the shaft 21 of the gearbox 19 on the side opposite the motor 14.

In this example the undirectional brake means 24 are disposed around one end 48 of the shaft 46, projecting cantilever fashion along the axis 47 outside the gearbox 19 inside a bell member 49 analogous to the bell member 43 and like the latter mounted on the gearbox 19 to form an integral and fixed part of the support 7.

The shaft 46 enters the bell member 49 in the immediate proximity of the gearbox 19 through the intermediary of two bearings 50, 51 disposed relative to the bell member 49 like the bearings 45 and 44, respectively, relative to the bell member 43 but which merely guide the shaft 46 in rotation about the axis 47 relative to the bell member 49 without either of these two bearings constituting a freewheel system as in the case of the bearing 45.

Furthermore, between the bearing 51 and its end 48, respectively near the bearing 51 and near this end 48, the shaft 46 carries two bearings 52, 53 respectively disposed like the bearing 40 and the bearing 39 and respectively enabling to rotate relative to the shaft 46 about the axis 47 flanges 54, 55 respectively identical to the flanges 29 and 28 of a coupling 56 having two parts 61, 63 adapted to rotate relative to each other about the axis 47 to oppose a defined torque to such rotation; the coupling 56 is in all respects identical to the coupling 26, i.e. it is a hysteresis type magnetic coupling the parts 61 and 63 of which respectively constitute the field system and the armature in the non-limiting example shown.

Reference should be made to the above description of the flanges 28 and 29 for information on the flanges 54 and 55, noting that the flange 54 has a continuous annular clearance 56 relative to the shaft 46 analogous to the clearance 32 and intended to prevent any contact between the flange 54 and the shaft 46; likewise, the flange 55 is designed so that it does not come into contact with the shaft 46 so that (unlike the shaft 21 which is its counterpart in the example shown in FIGS. 1 through 4) the shaft 46 is free to rotate about the axis 47 relative to the armature 63 of the coupling 56, comprising the assembly formed by the flanges 54 and 55 which are fastened together in the manner described with reference to the flanges 34 and 35 and which like the latter have cooling fins 57, 58 facing outwards and permanent magnets 59, 60 facing inwards; the field assembly 61 of the coupling 56 is fastened to the shaft 46 and comprises permanent magnets 62 disposed between the permanent magnets 59, 60 to define with the latter airgaps 64, 65 which can be adjusted by adjusting the distance between the flanges 54, 55 parallel to the axis 47. Any appropriate means are provided to immobilize the shaft 46 and the assembly comprising the two flanges 54 and 55 against relative movement in axial translation.

Projecting cantilever fashion from the end 48 of the shaft 46 along the axis 47, the flange 55 is fastened by a coupling 56 to a shaft 67 so that it rotates with the shaft 67 which is a coaxial extension of the shaft 46 and is mounted to rotate about the shaft 47 in the bell member 49 by means of a freewheel device 68 which, like the freewheel device 45, is unlocked in the direction of conjoint rotation of the shafts 67 and 46 corresponding to the spooling direction 10 of the drum 8 and locked in the opposite direction, i.e. in the direction of rotation of the shafts 67 and 46 about the axis 47 corresponding to the unspooling direction 12 of the drum 8.

Under these conditions, if the output shaft 18 of the motor 14, not shown in these figures, rotates about its axis in a direction to rotate the drum 8 in the spooling direction 10, the freewheel device 68 does not offer any impediment to the armature 63 of the coupling 56 turning in unison with the field assembly 61 of the latter, so that the presence of the unidirectional brake means 24 does not then apply any overload to the motor 14. If, on the other hand, the output shaft 18 of the latter rotates in a direction corresponding to the unspooling direction 12 of the drum 8 the freewheel device 68 immobilizes the armature 63 against conjoint rotation with the field assembly 61 about the axis 47 so that the coupling 56 offers a constant resisting torque to the rotation of the shaft 46 about its axis 47 and therefore to rotation of the output shaft 18 of the motor 18; in other words, the arrangement shown in FIG. 5 yields the same result as that shown in FIGS. 1 through 4.

In an alternative embodiment of the FIG. 4 example, shown in chain-dotted outline in that figure, the shaft 67 is mounted to rotate in the bell member 49 by means of the freewheel device 68 and constitutes the output shaft of an auxiliary motor 69 fastened to the bell member 49 in the position which the motor 14 occupies in the example of FIG. 1 through 4.

Unlike the motor 14, in which the speed and rotation direction of the output shaft 18 can vary and which to this end is of the asynchronous type, the motor 69 is selected and/or supplied with electrical power for example via the cable 2 and a commutator (not shown) coaxial with the drum 8 from the connection module 15 under the control of the control means 99 so that its output shaft 67 rotates about the axis 47 at constant speed, although the constant speed may optionally be varied, and in a direction corresponding to the direction of rotation of the shaft 46 about the axis 47 corresponding to the spooling direction 10 at least as long as the motor 14 is supplied with electrical power under the control of the means 99 so that its output shaft 18 rotates about its axis 17 in a direction corresponding to the spooling direction 10. On the other hand, the motor 69 is preferably controlled in such a way that its shaft 67 is stopped when the motor 14 is energized so that its output shaft 18 rotates in a direction corresponding to the unspooling direction 12 and likewise when the motor 14 is stopped by interrupting its electrical power supply.

The motor 69 therefore contributes to the driving of the drum 8 in the spooling direction 10 so that a less powerful motor 14 is required than in the example of FIGS. 1 through 4 and the energy to be dissipated at the coupling 56 in the form of heat when the drum 8 rotates in the unspooling direction 12 is reduced. It may be assumed that the output shaft 67 of the motor 69 continues to rotate in a direction corresponding to the spooling direction 10 when the motor 14 drives the drum 8 in the unspooling direction 12, but this would cause greater slip between the field assembly 61 and the armature 63 of the coupling 56, i.e. generation of more heat to be dissipated.

The motor 69 is an asynchronous motor, for example.

Other calibrated unidirectional brake means may naturally be used without departing from the scope of the present invention.

Whatever brake means are used, the drive motor 14 rotating the drum 8 about its axis 9 relative to the support 7 in the spooling direction 10 or in the unspooling direction 12 is controlled by frequency variation of its electrical power supply by control means 99 so as to maintain in the cable 2 a tension of approximately constant value when spooling and when unspooling the cable 2.

To this end means responsive to this tension supply to the control means 99 a signal representing the actual value of the tension at any time or a signal representing the result of comparing this actual value at any time with minimal and maximal set point limiting values.

FIGS. 1 through 3 show three embodiments 70, 71, 72 of means responsive to the tension in the cable 2 and the choice of which of these means is employed is independent of the choice regarding the position and nature of the calibrated unidirectional brake means 24 relative to the output shaft 18 of the drive motor 14 of the drum 8 or a shaft fastened to the shaft 18 to rotate with it in both directions.

In the FIG. 1 example, between the areas 4 and 5 the cable 2 follows a path comprising in succession, from area 4 to area 5, an approximately horizontal section 73 between the spiral 11 spooled on the drum 8 and a direction-changer pulley wheel 76 mounted to rotate about an axis 77 parallel to the axis 9 on an arm 78 adapted to pivot by a limited amount on the support 7 about an axis 79 parallel to the axis 9, next an approximately vertical section 74 between the direction-changer pulley wheel 76 and a quadrant 80 for guiding the cable 2 in the immediate proximity of the ground 6 and fastened to the support 7, and finally a section 75 running along the ground 6, i.e. approximately horizontal, between the quadrant 80 and the electrical connection module 15 fixed with respect to the ground 6 and representing the physical embodiment of the area 5.

On the opposite side of the axis 77 of the direction-changer pulley wheel 76 relative to the axis 79 the arm 78 has fastened to it a counterweight 81 whose distance from the axis 79 is preferably adjustable so that the counterweight 81 is able to balance an adjustable tension in the cable 2 regarded as normal and so that any variation in the value of the tension pivots the lever 78 about the axis 79 in a direction 82 corresponding to a downward movement of the direction-changer pulley wheel 76 if the actual value of the tension in the cable 2 becomes greater than this normal value and a direction 83 corresponding to an upward movement of the direction-changer pulley wheel 76 if the actual value of this tension falls below the normal value.

Thus the orientation of the arm 78 about the axis 79 relative to the support 7 is characteristic of the actual value of the tension in the cable 2 and means for sensing this position may be used to send a representative signal to the control means 99 to control the motor 14.

These means may comprise a rotary potentiometer carried by the support 7 near the axis 79 and kinematically linked to the arm 78 so as to produce a signal representative of the orientation of the arm 78 and consequently of the actual tension in the cable 2. This signal is routed to the control means 99 where its value is compared with set point values respectively corresponding to a maximum permissible value of the tension in the cable 2 and a minimum permissible value of this tension to produce a signal representative of the result of this comparison and to control the motor 14 automatically by varying the frequency, i.e. by varying the rotation speed of its output shaft, in such a way as to tend to re-establish a permissible tension in the cable 2, i.e. a tension between the maximal and minimal set point values.

The magnitude of the rotation of the arm 78 about the axis 79 relative to the support 7 constitutes a displacement signal representative of the actual value of the tension in the cable 2. The potentiometer 84 may be replaced by two end of travel detectors 85, 86 carried by the support 7 respectively above and below the arm 78, for example between the axis 79 and the pulley wheel 76, so that operation of either of these end of travel detectors by the arm 78 signifies that a respective set point limiting value of the displacement of the arm 78 relative to the support 7 due to the tension in the cable 2 has been reached, i.e. that the actual value of this tension has reached a minimal or maximal set point value. In this case operation of the end of travel detector 85 or 86 detected at the control means 99 leads to automatic correction of the rotation speed of the shaft 18 of the motor 14 to return the tension in the cable 2 to a value intermediate the aforementioned set point values, i.e. to return the arm 78 to an orientation such that neither of the two detectors 85 and 86 is operated.

FIG. 2 shows an example in which the cable 2 hangs freely, generally vertically, from a spiral spooled on the drum 8, for example, to a quadrant 80 disposed in the intermediate proximity of the ground 6 and fastened to the support 7. The cable 2 thus follows a path comprising, from the spiral spooled on the drum 8, an essentially rectilinear and vertical section 87, a curved section 88 through the quadrant 80 and an approximately horizontal section 89 running along the ground 6 between the quadrant 80 and the electrical connection module 15.

In this example the actual value of the tension in the cable 2 is detected by a swing-arm 90 which has inside the quadrant 80 an eyelet 91 in which the curved section 88 of the path of the cable 2 is inserted.

The eyelet 9 is suspended through the intermediary of the swing-arm 90 from a module 93 fastened to the support 7 and relative to which the swing-arm 90 can pivot about a horizontal axis 92 perpendicular to the direction 3 of displacement.

The geometry of the curved section 88 of the cable path depends on the tension applied to the cable 87; to be more precise, the greater the tension in the cable 2, the more is the section 88 stretched, so that the cable 2 applies to the eyelet 91 a force towards the area 5 causing the swing arm 9 to tilt as shown in FIG. 2; the lower the tension in the cable 2 the closer the section 87 tends to come to the ground 6, the section 88 then relaxing and the cable 2 no longer loading the eyelet 91, or virtually so, with the result that the swing-arm 90 tends to hang vertically from the axis 92.

Sensors (which are not shown but which may be analogous to the end of travel detectors 85 and 86 previously described) disposed inside the module 93 can detect two limiting orientations of the swing-arm 90 about the axis 92 relative to the module 91 respectively corresponding to a maximal set point value of the tension in the cable 2 and a minimal set point value of this tension, operation of either of the sensors causing a signal to be sent to the control means 99 leading to appropriate modification of the rotation speed of the output shaft 18 of the motor 14. A potentiometer analogous to the potentiometer 84 supplying a signal representative of the orientation of the swing-arm 90 could of course be used instead to supply a signal representative of the value of the tension in the cable 2.

Note that in FIG. 2 as in FIG. 1 the value of the tension in the cable 2 is detected by mechanical means for deviating the cable 2, namely the direction-changer pulley wheel 76 and the eyelet 91, adapted to be retracted to a greater or lesser extent in proportion to the value of the tension, and provided with means for sensing this position in the form of the potentiometer 84 or the end of travel detectors 85 and 86 of the lever 78 in FIG. 1 or in the form of a potentiometer corresponding to the potentiometer 84 or end of travel detectors of the swing-arm 90 corresponding to the end of travel detectors 85 and 86 in FIG. 2.

These two figures concern the application of a spooling and unspooling device in accordance with the invention to supplying a machine mobile relative to the ground and more particularly relative to an electrical connection module 15 which is fixed relative to the ground 6 and which supplies the machine in question with electrical power, but analogous means drawing their inspiration from those shown in FIG. 1, for example, could be used when, as shown in FIG. 3, a device in accordance with the invention is used to supply electrical power to a load 16 suspended to a lifting machine.

Nevertheless, in such cases, provision may also be made for sensing the tension in the cable 2 directly by means 72 mechanically in series with the cable 2 between the areas 4 and 5 of the latter, a position in the immediate proximity of the area 5 being usually preferred.

The means 72 for sensing directly the tension in the cable 2 are schematically represented in the form of a block 93 in FIG. 3 and may be implemented in various forms; they may be integrated into the connection of the cable 2 to the load 16 or in parallel with a loop of the cable 2 in the immediate proximity of the load 16; they may comprise any type of telescopic system comprising two parts respectively connected to the cable 2 and to the load 16 and occupying a relative position characteristic of the tension between the cable 2 and the load 16, for example a linear potentiometer or an inductive system combined with a spring, in the manner of a spring balance, or implemented in any other form to send a signal either directly representative of the actual value of the tension in the cable 2 or representative of the result of comparing the value of a displacement between two parts of the means 93 respectively connected to the cable 2 and to the load 16 and two set point limiting values of said displacement corresponding to respective maximal and minimal set point limiting values of the tension in the cable 2 in order to route this signal to the control means 99 and to process this signal in the control means to govern the rotation speed of the shaft 18 of the motor 14 to maintain the tension in the cable 2 approximately at a defined constant value.

Figure 6:
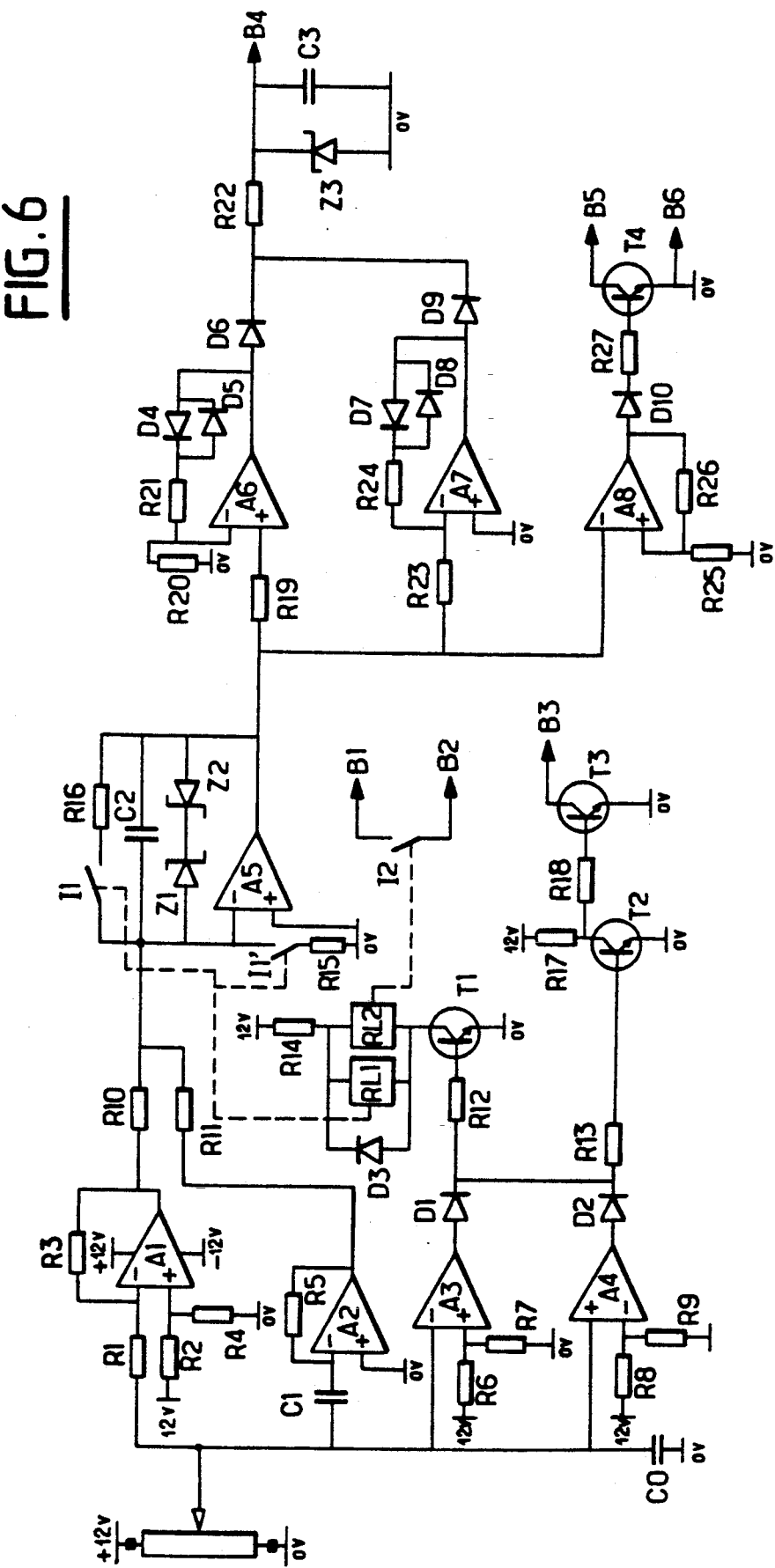
FIG. 6 is a preferred electrical schematic of part of the control means of the drive motor of a device in accordance with the invention.

Referring now to FIG. 6 which shows in detail part of control device 99 of the motor 14, this device 99 comprises a control circuit using a signal supplied by the means for sensing the tension in the cable or the like associated with a variable frequency electronic control circuit of the motor 14 of a type familiar to the man skilled in the art and that will not be described here.

The control device in accordance with the invention is described in detail hereinafter.

The potentiometer 84 from FIG. 1 is shown in its electrical symbol form P.

Its resistive track is connected between a positive DC supply terminal (at +12 V DC, for example) and a ground terminal (0 V).

The cursor of P is connected via a resistor R1 to the inverting input of a first operational amplifier A1 the non-inverting input of which is connected to the +12 V supply through a resistor R2. The output of A1 is connected to its inverting input via another resistor R3. A resistor R4 is provided between said non-inverting input and ground (0 V).

The cursor of P is also connected via a capacitor C1 to the inverting input of a second operational amplifier A2, the non-inverting input of which is grounded. A resistor R5 is connected between the aforementioned inverting input and the output of A2.

The cursor of P is further connected to the inverting input of a third operational amplifier A3. The non-inverting input of A3 is connected to the +12 V supply via a resistor R6 and grounded (0 V) via a resistor R7.

The cursor of P is additionally connected to the non-inverting input of a fourth operational amplifier A4 the inverting input of which is connected to the +12 V DC supply via a resistor R8 and grounded (0 V) via a resistor R9.

The operational amplifiers A3 and A4 operate in open loop mode.

A capacitor C0 connects the cursor of P to ground (0 V).

The outputs of A1 and A2 are connected via respective serial resistors R10 and R11 to the inverting input of a fifth operational amplifier A5. The non-inverting input of A5 is grounded. Its output is connected to its inverting input via a parallel circuit comprising:

in a first branch, two zener diodes Z1 and Z2 in series opposition;

in a second branch, a capacitor C2; and in a third branch, a series circuit comprising a resistor R16 and a switch I1 which is part of a relay RL1.

The inverting input of A5 is finally grounded via a series circuit comprising another switch I1' of the relay RL1 and a resistor R15.

The outputs of A3 and A4 are respectively connected to anodes of two diodes D1 and D2 the cathodes of which are connected together and to a first end of a resistor R12. The other end of R12 is connected to the base of an NPN bipolar transistor T1 the emitter of which is grounded and the collector of which is connected to first control terminals of relays RL1 and RL2. The second control terminals of these relays are connected to the +12 V supply via a resistor R14. A diode D3 shunts the control input of the two relays.

A switch I2 which is part of the relay RL2 is connected between two first output terminals B1 and B2 of the circuit.

The cathodes of D1 and D2 are connected together and to a first end of a resistor R13 the other end of which is connected to the base of an NPN bipolar transistor T2. The emitter of T2 is grounded. Its collector is connected to the +12 V supply via a resistor R17 and to the base of another NPN bipolar transistor T3 via a resistor R18.

The emitter of T3 is grounded. Its collector is connected to another output terminal B3 of the circuit.

The output of A5 is connected via a resistor R19 to the non-inverting input of a sixth operational amplifier A6 the inverting input of which is grounded via a resistor R20. This inverting input is also connected to one end of a resistor R21. A reverse parallel circuit comprising two diodes D4 and D5 is connected between the other end of R21 and the output of A6.

The output of A5 is further connected via a resistor R23 to the inverting input of a seventh operational amplifier A7 the non-inverting input of which is grounded. The inverting input of A7 is also connected to one end of a resistor R24. A reverse parallel circuit comprising two diodes D7 and D8 is connected between the other end of R24 and the output of A7.

The outputs of A6 and A7 are connected to the anodes of respective diodes D6 and D9 the cathodes of which are connected together and via a series resistor R22 to another output terminal B4 of the circuit. A zener diode Z3 and a capacitor C3 are connected between this output terminal B4 and ground (0 V).

Finally the output of A5 is connected to the inverting input of an eighth operational amplifier A8 whose non-inverting input is grounded via a resistor R25 and connected to its output via a resistor R26. The output of A8 is connected to the anode of a diode D10 the cathode of which is connected via a resistor R27 to the base of another NPN bipolar transistor T4. The emitter of T4 is grounded and connected to an output terminal B6 of the circuit and its emitter is connected to an output terminal B5 of the circuit.

The eight operational amplifiers of the circuit described above are connected to a symmetrical DC power supply, for example +12 V and −12 V supplies relative to ground.

The terminals B1 through B6 of the circuit described hereinabove are connected to the motor control device as follows:

B1 and B2 are connected to corresponding inputs of the control device to indicate to it the active or inactive status of the control circuit, B3 is connected to a safety off input of the control device, B4 is connected to an input for setting the set point speed of the motor 14, and B5 and B6 are connected to inputs for setting the rotation direction of the motor 14.

The circuit described hereinabove operates in the following manner.

Note first of all that the voltage VP at the cursor of P relative to ground is between 0 V and +12 V. Its value is representative of the position of the arm 78 of the device of FIG. 1 and therefore of the tension in the cable or the like. In particular, the further the arm 78 pivots about its axis in the clockwise direction (i.e. the higher the tension in the cable), the higher the voltage VP.

Note also that the circuit based on A1 is an amplifier capable of supplying at its output a variable DC voltage equal to 2 VF−VP where VF is a fixed voltage defined by the divider bridge comprising the resistors R2 and R4. The voltage 2 VF thus defines a reference position for the cursor of P and therefore for the arm 78. A1 is thus an adapter which delivers a positive or negative voltage whose value is proportional to the offset relative to the reference position and whose sign defines the direction of this offset.

The circuit based on A2 is a differentiator circuit, i.e. it delivers at its output a voltage proportional to the speed at which the value of VP is changing, a negative voltage being produced when VP is increasing and a positive voltage being produced when VP is decreasing.

The circuit based on A5 is an integrator circuit which integrates the weighted algebraic sum of the voltages from A1 and A2, the values of the resistors R10 and R11 being chosen so that the voltage from the differentiator circuit predominates over the voltage from the adapter circuit.

The circuits based on A3 and A4 are comparator circuits adapted, as will be explained later, to trigger certain safety actions if the voltage VP exceeds a safe upper limit set by the values of R8 and R9 or falls below a safe lower limit set by the values of R6 and R7.

Note that the reference voltage 2 VF is between the abovementioned safe upper and lower limits.

The circuit based on A6 and A7 is an absolute value converter circuit capable of delivering at its output (where the diodes D6 and D9 are connected) a positive voltage equal to the absolute value of the voltage at the output of the integrator circuit. Note that this is a conventional diode threshold voltage compensator circuit.

Finally, the circuit based on A8 is a sign converter circuit capable of isolating or short-circuiting the output terminals B5 and B6 according to the sign of the voltage at the integrator output. To be more precise, if the voltage at the output of A5 is negative T4 is turned off whereas if this voltage is positive T4 is turned on.

The operation of the circuit is now described in detail.

Assume initially that the asynchronous motor 14 is rotating in the cable spooling direction to produce in the cable the set point tension determined by the counterweight 81, i.e. assume that VP is equal to the reference voltage 2 VF. Assume also that the integrator A5 is producing a negative voltage.

If the tension in the cable or the like when increases because the asynchronous motor 14 is tending to rotate at an excessive speed the arm 78 pivots clockwise. A1 therefore delivers a voltage which becomes progressively negative whereas A2 also delivers a negative voltage. The absolute value of the output voltage of the integrator A5 therefore decreases relative to its previous value and this absolute value is applied to the control device of the asynchronous motor 14 to reduce the set point rotation speed of the latter.

Note that:

the differentiator circuit A2 can reduce the output voltage of A5 at a rate proportional to the rate at which VP is changing to cause the motor 14 to modify its set point rotation speed commensurately faster; and in this case, the output voltages of A1 and A2 are of the same sign, which contributes to the same effect, namely fast modification of the motor set point rotation speed.

If, because the set point rotation speed of the motor 14 is now decreasing, the tension in the cable tends to return to its set point value, VP decreases towards the reference voltage 2 VF.

In this case A1 still delivers a negative voltage but its absolute value is decreasing, wherein A2 delivers a positive voltage whose value is proportional to the rate at which VP returns towards the reference value 2 VF. Thus depending on the respective values of the output voltages of A1 and A2, which are of opposite sign, the absolute value of the output voltage of A5:

increases again, to increase the set point rotation speed of the motor 14 (if the tension in the cable tends to be re-established too quickly), or remains essentially unchanged (if the tension in the cable returns to the set point tension at a rate regarded as normal), or continues to decrease to further reduce the rotation speed of the motor 14 (if the tension in the cable not returning sufficiently quickly to the set point tension).

Note that in all the above cases the output voltage of A5 remains negative so that the terminals B5 and B6 are isolated from each other, which indeed corresponds to rotation of the motor 14 in the spooling direction.

Equivalent explanations could be set out for the case in which the tension in the cable tends to fall below the set point value, i.e. if the arm 78 turns anticlockwise from its reference position, the voltage VP being then less than 2 VF. In this case the polarities of the voltages produced by A1 and A2 are reversed, as is the effect of the latter on the output voltage of A5.

The operation of the circuit when the device changes from spooling to unspooling via a stopped phase will now be described.

This implies firstly a phase in which the cable is decelerated, which itself causes an increase in the tension of the cable which the control circuit attempts to compensate as explained hereinabove.

In this case the voltages produced by A1 and A2 are both negative for a period and/or with a value such that the capacitor C2 of the integrator is discharged completely and then charged with the opposite polarity. A5 therefore supplies a positive voltage at the end of this deceleration. The terminals B5 and B6 are then short-circuited and the control device set point rotation direction changes to the unspooling direction.

Further acceleration of the cable in the opposite direction (start of unspooling) again causes the tension in the cable to increase, and the control circuit again attempts to cancel this out, the effect of which is to complete the charging of C2 with said opposite polarity.

Note that by making the output voltage of A2 predominant over the output voltage of A1 (in respect of the behaviour of the integrator means) a deceleration-direction reversal-acceleration phase is able to invert the polarity of C2 and therefore the polarity of the output voltage of A5.

Control during unspooling is exercised in the same manner as described hereinabove. In particular, an increase in the tension in the cable produces at the outputs of A1 and A2 negative voltages which increase the charge on C2 and therefore the output voltage of A5. The motor 14 then accelerates in order to cancel this excess tension. Likewise, a decrease in the tension produces at the outputs of A1 and A2 positive voltage which tend to discharge C2 to reduce the output voltage of A5 and slow the motor 14.

Note that the effect of the circuit of the present invention, by virtue of the combination of the circuits A1 and A2 and of the twin-polarity integrator A5 receiving a weighted algebraic sum of the outputs of A1 and A2, is to control the motor 14 rotation direction and speed uniquely on the basis of information representative of the tension in the cable. This advantageously avoids the need to detect in any way whatsoever the direction of displacement of the cable. The circuit of the invention also enables the motor to react quickly if the tension moves away from the set point tension in either direction and to react in a more differentiated way, and in all cases more slowly, when the tension is approaching the set point tension. The control action is therefore extremely effective in that it is both fast and smooth, any onset of high-speed oscillation in the control loop being prevented.

The threshold circuits based on A3 and A4 operate in the following manner. Immediately the voltage VP moves above or below the range of permissible values defined by the safe upper and lower limits mentioned above, the voltage at the first end of R13 becomes positive and T2 is turned on which turns off T3. The motor stop control terminal B3 previously grounded via T3 is therefore "floating" which stops the motor 14 (emergency stop). At the same time T1 is turned on which energizes the relays RL1 and RL2. The switches I1, I1' and I2 are therefore closed. B1 and B2 are therefore short-circuited, which tells the control device of the motor 14 that "normal" control of tension by the circuits A1, A2 and A5 in particular is no longer operative. The effective of I1 and I1' closing is to reset the integrator A5 by discharging its capacitor C2, with the specific aim of returning to a normal control situation as quickly as possible when the motor is started again in one direction or the other.

After this restart, as soon as VP returns to the range of permissible values mentioned above the relays RL1 and RL2 drop out, I1, I1' and I2 are again opened and control as described above is re-established.

Of course, the man skilled in the art will know how to make any modification that occurs to him to the control circuit as described. The man skilled in the art will also known how to adapt it to a device of the type described with reference to FIG. 2, the swing-arm 90 then, by virtue of its angular position, serving as an element for sensing the tension in the cable (in association with a potentiometer or the like).

Furthermore, if the nature of the auxiliary motor 69 allows it, the rotation speed of its output shaft 67 may be controlled on the same basis as the motor 14 to maintain the tension in the cable 2 at an approximately constant value during spooling.

Moreover, if the drum 8 is driven by a gearbox 19 having multiple input shafts 21 each of which may be kinematically connected to a respective drive motor 14 in a manner that is not shown but will be familiar to the man skilled in the art each of these motors could be controlled in the manner described in terms of the rotation speed of its output shaft 18 connected without any possibility of slip to the respective input shaft 21 of the gearbox 17 and could be associated with a respective unidirectional brake device as shown in FIG. 4 or FIG. 5, which could equally well be provided as a single unit mounted in the manner described with reference to FIG. 4 (in association with one of the drive motors 14) or in the manner described with reference to FIG. 5 (in association with a shaft 46 of the gearbox 17 for which there is no corresponding drive motor 14).

Generally speaking, the man skilled in the art could put forward numerous variants of the devices that have been described and shown without departing from the scope of the present invention.

There is claimed:

1. Device for spooling and unspooling a power cable or the like upon relative displacement of two areas connected to each other by the cable or the like, said device comprising:

a support disposed in one of said areas, a drum mounted to rotate about a first axis relative to the support and adapted to receive the cable or the like, drive means for rotating the drum about the first axis in a direction to spool the cable or the like and in a direction to unspool the cable or the like by applying traction to the cable between said areas, said drive means comprising an electric drive motor carried by the support and having a rotary output shaft and a kinematic linkage between the drive motor output shaft and the drum so as to associate with the spooling and unspooling directions respective directions of rotation of the drive motor output shaft, and control means for said drive means comprising means for supplying electrical power to the drive motor, wherein:

the drive motor is of the asynchronous type, its electrical power supply means being alternating current supply means and its output shaft is in permanent slip-free engagement with the drum through the intermediary of the kinematic linkage, the control means are adapted to cause the drive motor to be supplied with power by the means for supplying it with electrical power so as to rotate its output shaft either in a direction corresponding the spooling direction or in a direction corresponding to the unspooling direction or to interrupt the supply of power to the drive motor and comprise variable frequency control means responsive to the cable tension to control the supply of power to the drive motor to maintain said tension at an approximately constant value on spooling and on unspooling the cable or the like, and means are provided to exert calibrated unidirectional braking on the output shaft of the drive motor in the direction corresponding to the unspooling direction.

2. Device according to claim 1 wherein the means for exerting calibrated unidirectional braking on the output shaft of the drive motor comprise:

a brake shaft mounted to rotate about a second axis relative to the support, permanent slip-free kinematic linkage means between the brake shaft and the output shaft of the drive motor so as to associate respective directions of rotation of the brake shaft with the spooling and unspooling directions, a coupling of the type comprising two parts rotatable relative to each other about an axis against a defined resisting torque, a first of said parts being coaxial with and fastened to the brake shaft, and a freewheel mechanism connecting the second of said parts to the support being unlocked in the rotation direction of the brake shaft corresponding to the spooling direction and locked in the rotation direction of the braking shaft corresponding to the unspooling direction.

3. Device according to claim 1 wherein the means for exerting calibrated unidirectional braking on the output shaft of the drive motor comprise:

a brake shaft mounted to rotate about a second axis relative to the support, permanent slip-free kinematic linkage means between the brake shaft and the output shaft of the drive motor so as to associate respective rotation directions of the brake shaft with the spooling and unspooling directions, a coupling of the type comprising two parts rotatable relative to each other about an axis against a defined resisting torque, a first of said parts being coaxial with and fastened to the brake shaft, an auxiliary electric motor having a rotary output shaft coaxial with the brake shaft and carrying coaxially with and fastened to it the second of said parts, means for supplying electrical power to the auxiliary motor controlled by the control means to supply electrical power to the auxiliary motor in such a way as to rotate the output shaft of the latter in a direction corresponding to the spooling direction at least during the supply of power to the drive motor by the means for supplying electric power to the latter to rotate the output shaft of the drive motor in a direction corresponding to the spooling direction or to interrupt the supply of electrical power to the auxiliary motor, a freewheel mechanism connecting the output shaft of the auxiliary motor to the support which is unlocked in the rotation direction of the output shaft of the auxiliary motor corresponding to the spooling direction and locked in the rotation direction of the output shaft of the auxiliary motor corresponding to the unspooling direction.

4. Device according to claim 3 wherein the control means are adapted to interrupt the supply of power to the auxiliary motor by the means for supplying electrical power to the latter while the supply of power to the drive motor by the means for supplying electrical power to the latter is interrupted and during supply of power to the drive motor by the means for supplying the latter with electrical power to rotate the output shaft of the drive motor in a direction corresponding to the spooling direction.

5. Device according to claim 3 wherein the auxiliary motor is a synchronous motor and the means for supplying it with electrical power are alternating current power supply means.

6. Device according to claim 2 or claim 3 wherein the coupling is a hysteresis type magnetic coupling.

7. Device according to claim 1 wherein the means responsive to said tension comprise means for sensing said tension directly mechanically in series with said cable or the like between said areas.

8. Device according to claim 1 wherein the means responsive to said tension comprise means for deviating said cable or the like between said areas carried by the support and adapted to be retracted reversibly due to the effect of said tension and means for sensing the position of said deviator means.

9. Device according to claim 1 wherein the means responsive to said tension comprise means for producing a signal whose value is representative of the value of said tension, means for setting set point values of said signal corresponding respectively to maximal and minimal permissible values of said tension, means for comparing the value of the signal to the set point values and producing a signal representative of the result of said comparison and means for controlling according to this signal the supply of power to the drive motor by the means for supplying electrical power to the latter to maintain the actual value of the tension between the set point values.

10. Device according to claim 1 wherein the means for variable frequency control of the supply of power to the drive motor comprise:

a control circuit which receives an electrical signal representative of the tension in the cable and which comprises:

adapter means adapted to produce an electric signal whose value is a monotonous function of the difference between the actual value of the tension and a set point value of said tension, differentiator means adapted to produce an output electrical signal whose value is a monotonous function of the rate of variation of the actual value of the tension, twin-polarity integrator means receiving the electrical signals produced by the adapter means and by the differentiator means, and a variable frequency control circuit conditioning speed variation and change of direction according to the output of said integrator means.

11. Device according to claim 10 wherein the electric signals produced by the adapter means and by the differentiator means are positive or negative voltages whose signs are representative of the position of the actual value of the tension relative to the set point value of the tension and the direction of variation of the actual value of the tension, respectively, and wherein a weighted algebraic sum of said voltages is applied to the integrator means.

12. Device according to claim 10 wherein the control circuit further comprises at the output of the integrator means absolute value converter means and polarity-responsive switching means the respective outputs of which are connected to a speed set point input and a rotation direction set point input of the motor control device.

13. Device according to claim 10 further comprising comparator means setting safe upper and lower limits for the actual value of the tension, said comparator means being adapted to apply to the motor control device an emergency stop signal and to reset the integrator means.

* * * * *